(12) United States Patent
Ishiwata

(10) Patent No.: US 10,775,603 B2
(45) Date of Patent: Sep. 15, 2020

(54) PHASE DISTRIBUTION CALCULATION METHOD, EVALUATION METHOD, AND IMAGE PROCESSING DEVICE

(71) Applicant: OLYMPUS CORPORATION, Hachioji-shi, Tokyo (JP)

(72) Inventor: Hiroshi Ishiwata, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 257 days.

(21) Appl. No.: 15/863,153

(22) Filed: Jan. 5, 2018

(65) Prior Publication Data

US 2018/0217369 A1 Aug. 2, 2018

(30) Foreign Application Priority Data

Feb. 2, 2017 (JP) .................................. 2017-017994

(51) Int. Cl.
| | | |
|---|---|---|
| G02B 21/36 | (2006.01) |
| G02B 21/00 | (2006.01) |
| G06T 7/55 | (2017.01) |
| G06T 5/40 | (2006.01) |
| G06T 5/50 | (2006.01) |
| G02B 21/26 | (2006.01) |

(52) U.S. Cl.
CPC ....... *G02B 21/367* (2013.01); *G02B 21/0056* (2013.01); *G06T 5/40* (2013.01); *G06T 5/50* (2013.01); *G06T 7/55* (2017.01); *G02B 21/26* (2013.01); *G02B 21/361* (2013.01); *G06T 2207/10056* (2013.01); *G06T 2207/10148* (2013.01)

(58) Field of Classification Search
CPC .......................... G02B 21/367; G02B 21/0056
See application file for complete search history.

(56) References Cited

U.S. PATENT DOCUMENTS

| | | | | |
|---|---|---|---|---|
| 5,610,897 A | * | 3/1997 | Yamamoto | ........... G11B 7/0051 |
| | | | | 369/124.03 |
| 5,751,475 A | | 5/1998 | Ishiwata et al. | |
| 2012/0057013 A1 | | 3/2012 | Ishiwata | |
| 2014/0285650 A1 | * | 9/2014 | Ishiwata | ............ G06K 9/00127 |
| | | | | 348/79 |

FOREIGN PATENT DOCUMENTS

| | | | |
|---|---|---|---|
| JP | 07225341 A | 8/1995 |
| JP | 09015504 A | 1/1997 |
| JP | 2001272603 A | 10/2001 |
| JP | 2011229409 A | 11/2011 |
| JP | 2012073591 A | 4/2012 |
| JP | 2014209085 A | 11/2014 |

* cited by examiner

*Primary Examiner* — Tuan H Nguyen
(74) *Attorney, Agent, or Firm* — Holtz, Holtz & Volek PC

(57) ABSTRACT

A phase distribution calculation method includes: moving a focal position of an optical system to a plurality of positions within a phase object, the plurality of positions being different from each other in an optical axis direction of the optical system, and acquiring an image via the optical system in each of the plurality of positions; calculating a first phase distribution of a three-dimensional region that corresponds to a plurality of images acquired in the plurality of positions, in accordance with the plurality of images; and correcting the first phase distribution in accordance with a change in the optical axis direction in a region of interest specified in the three-dimensional region.

9 Claims, 14 Drawing Sheets

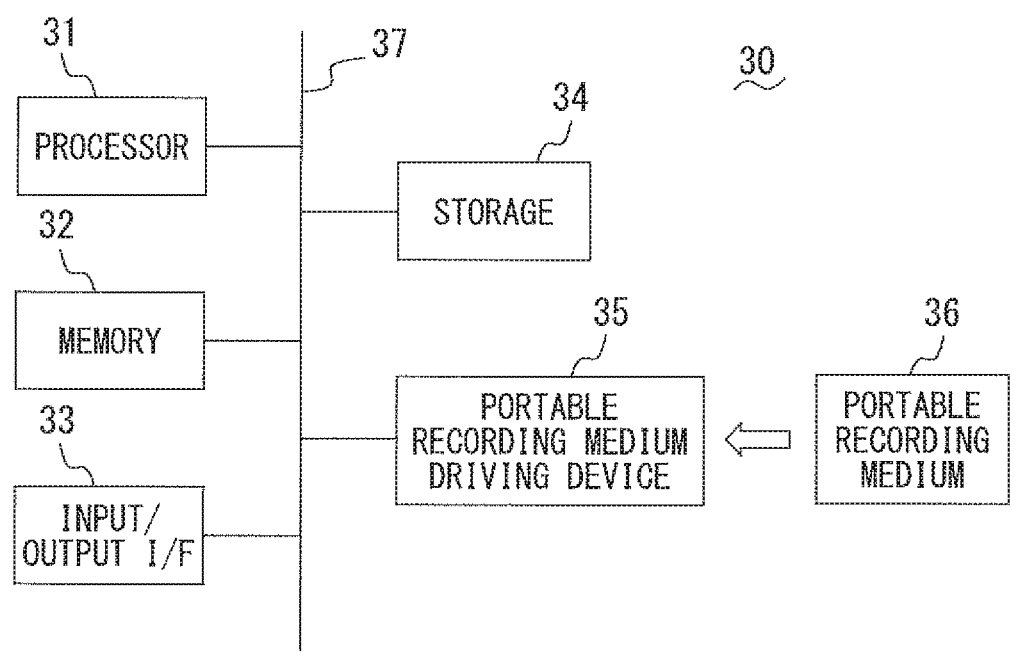
F I G. 3

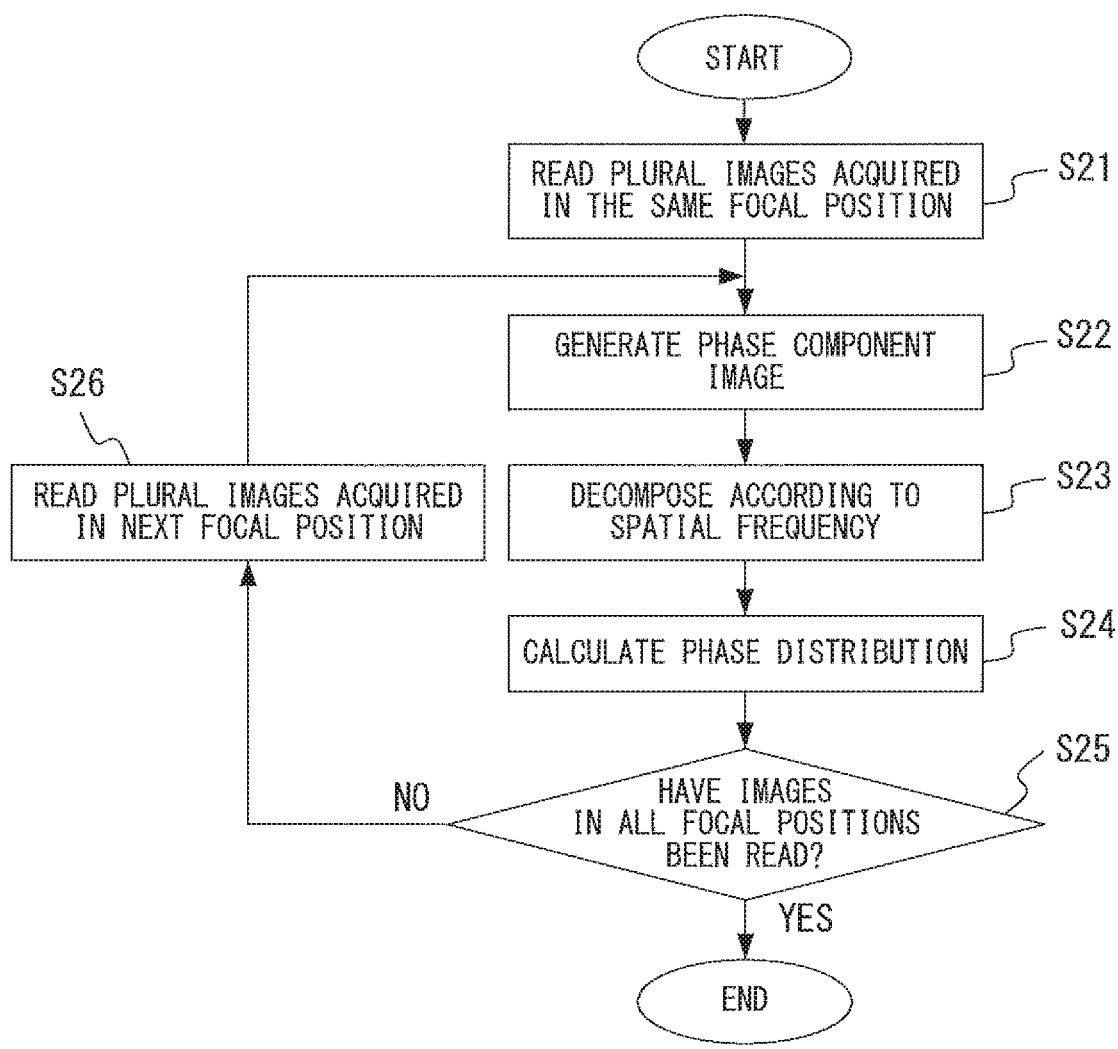
F I G. 6

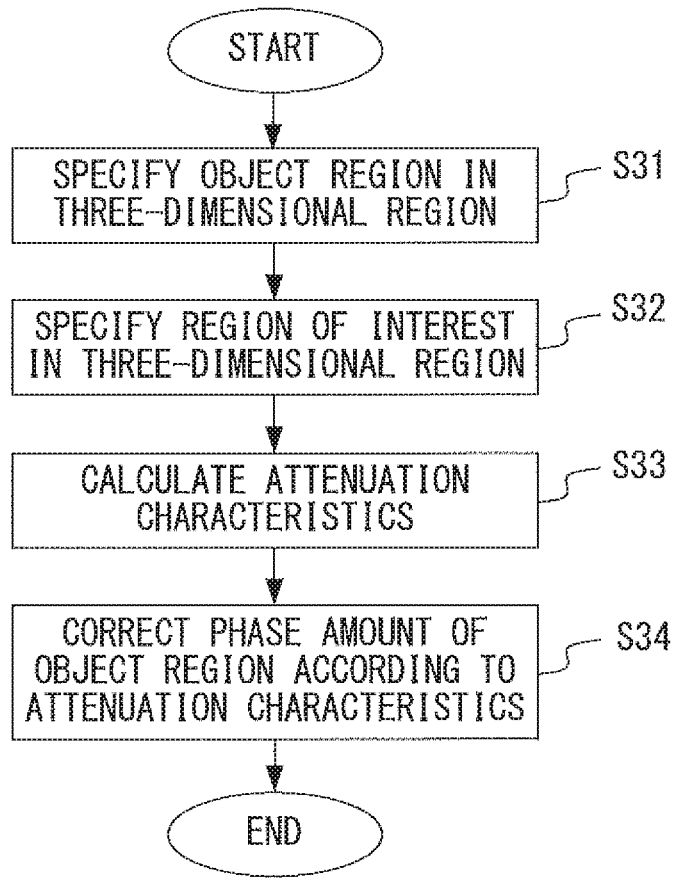
F I G. 9

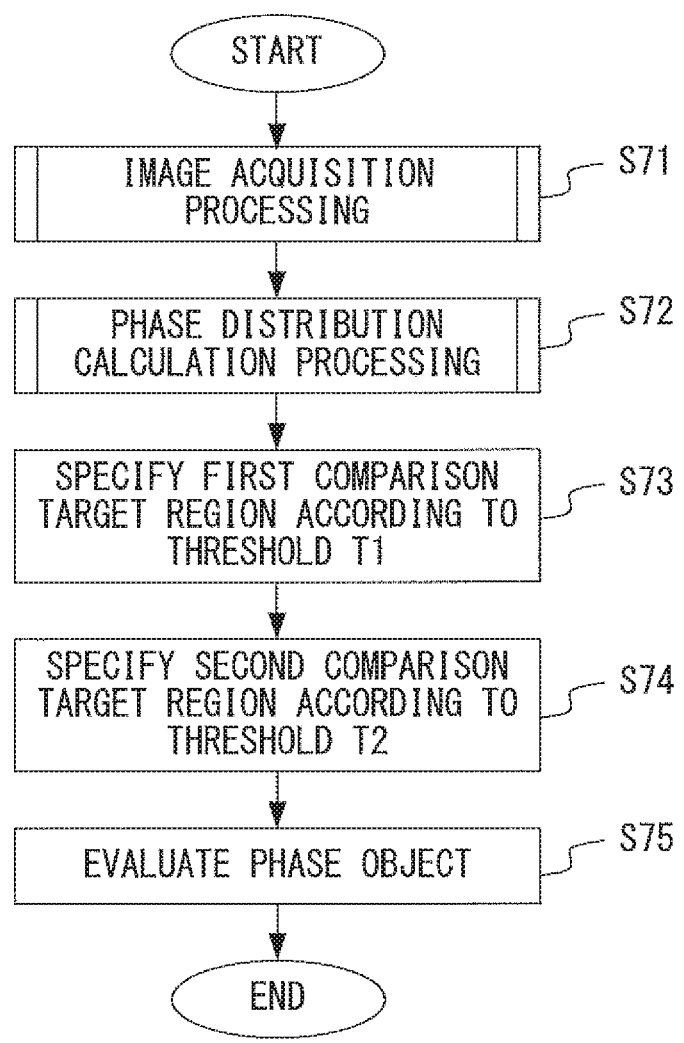
F I G. 1 4

PHASE DISTRIBUTION CALCULATION METHOD, EVALUATION METHOD, AND IMAGE PROCESSING DEVICE

CROSS REFERENCE TO RELATED APPLICATIONS

This application is based upon and claims the benefit of priority from the prior Japanese Patent Application No. 2017-017994, filed on Feb. 2, 2017, the entire contents of which are incorporated herein by this reference.

BACKGROUND OF THE INVENTION

Field of the Invention

The present invention relates to a phase distribution calculation method, an evaluation method, and an image processing device, an image processing system.

Description of the Related Art

Conventionally, a technology is known for observing a phase object such as a biological cell by calculating the phase distribution of the phase object using a phase-contrast microscope, a differential interference contrast microscope, or the like so as to visualize the phase object. In addition, a technology is known for calculating a phase distribution with a high accuracy by compensating for an amount of attenuation in a phase amount due to the scattering of light within a phase object. The technologies above are described, for example, in Japanese Laid-Open Patent Publication No. 2001-272603.

When a relatively large phase object such as a spheroid or a colony in which cells form a three-dimensional aggregate is a target to be observed, a technology for compensating for an attenuated phase amount is particularly effective, and it is requested that this technology be further improved.

SUMMARY OF THE INVENTION

A phase distribution calculation method in one aspect of the present invention includes: sequentially moving a focal position of an optical system that converts a phase distribution into an image intensity distribution to a plurality of positions within a phase object, the plurality of positions being different from each other in an optical axis direction of the optical system, and acquiring an image via the optical system in each of the plurality of positions; calculating a first phase distribution of a three-dimensional region that corresponds to a plurality of images acquired in the plurality of positions, in accordance with the plurality of images; and correcting the first phase distribution in accordance with a change in the optical axis direction in a region of interest specified in the three-dimensional region.

An evaluation method in one aspect of the present invention includes: calculating a second phase distribution by correcting the first phase distribution using the phase distribution calculation method described in the aspect above; specifying a first comparison target region in the three-dimensional region in accordance with the second phase distribution and a first threshold that is a phase amount that corresponds to a specified structure within the phase object; specifying a second comparison target region in the three-dimensional region in accordance with the second phase distribution and a second threshold that is a phase amount smaller than the first threshold; and evaluating the phase object in accordance with a result of a comparison between the first comparison target region and the second comparison target region.

An image processing device in one aspect of the present invention is an image processing device that processes a plurality of images acquired by a microscope device. The microscope device includes an optical system that converts a phase distribution into an image intensity distribution, and the microscope device is configured to sequentially move a focal position of the optical system to a plurality of positions within a phase object, the plurality of positions being different from each other in an optical axis direction of the optical system, and to acquire an image via the optical system in each of the plurality of positions. The image processing device is configured to calculate a first phase distribution of a three-dimensional region that corresponds to a plurality of images that are acquired by the microscope device in the plurality of positions, in accordance with the plurality of images, and to correct the first phase distribution in accordance with a change in the optical axis direction in a region of interest that is specified in the three-dimensional region in accordance with the first phase distribution.

An evaluation method in another aspect of the present invention includes: sequentially moving a focal position of an optical system that converts a phase distribution into an image intensity distribution to a plurality of positions within a phase object, the plurality of positions being different from each other in an optical axis direction of the optical system, and acquiring an image via the optical system in each of the plurality of positions; calculating a first phase distribution of a three-dimensional region that corresponds to a plurality of images acquired in the plurality of positions, in accordance with the plurality of images; specifying a first comparison target region in the three-dimensional region in accordance with the first phase distribution and a first threshold that is a phase amount that corresponds to a specified structure within the phase object; specifying a second comparison target region in the three-dimensional region in accordance with the first phase distribution and a second threshold that is a phase amount smaller than the first threshold; and evaluating the phase object in accordance with a result of a comparison between the first comparison target region and the second comparison target region.

BRIEF DESCRIPTION OF THE DRAWINGS

The present invention will be more apparent from the following detailed description when the accompanying drawings are referenced.

FIG. 3 illustrates the configuration of an image processing device 30.

FIG. 6 illustrates an example of a flowchart of phase distribution calculation processing.

FIG. 9 illustrates an example of a flowchart of phase distribution correction processing.

FIG. 14 illustrates another example of the flowchart of phase object evaluation processing.

DESCRIPTION OF THE EMBODIMENTS

First Embodiment

Figure 1:
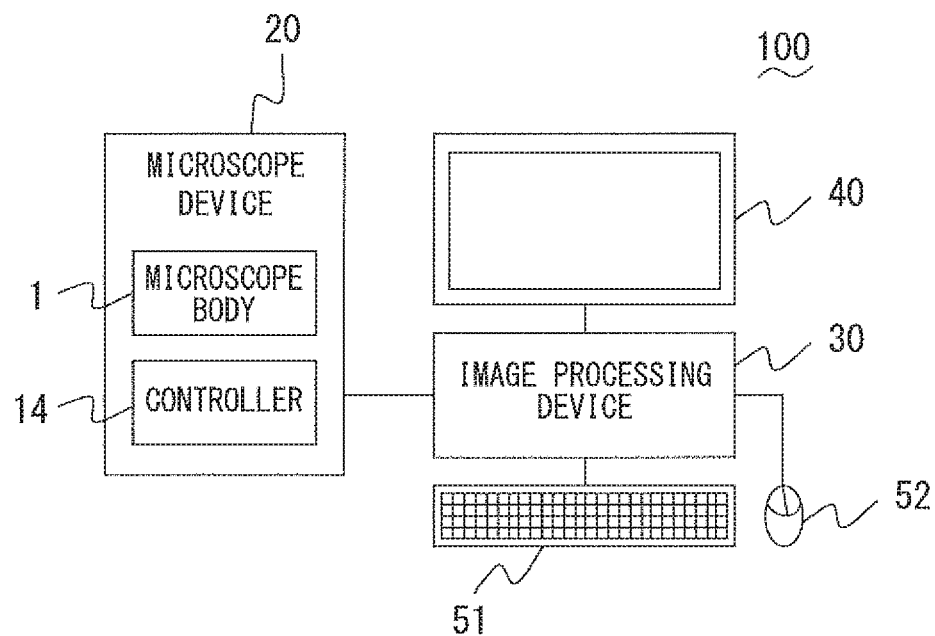
FIG. 1 illustrates the configuration of an image processing system 100.
Figure 2:
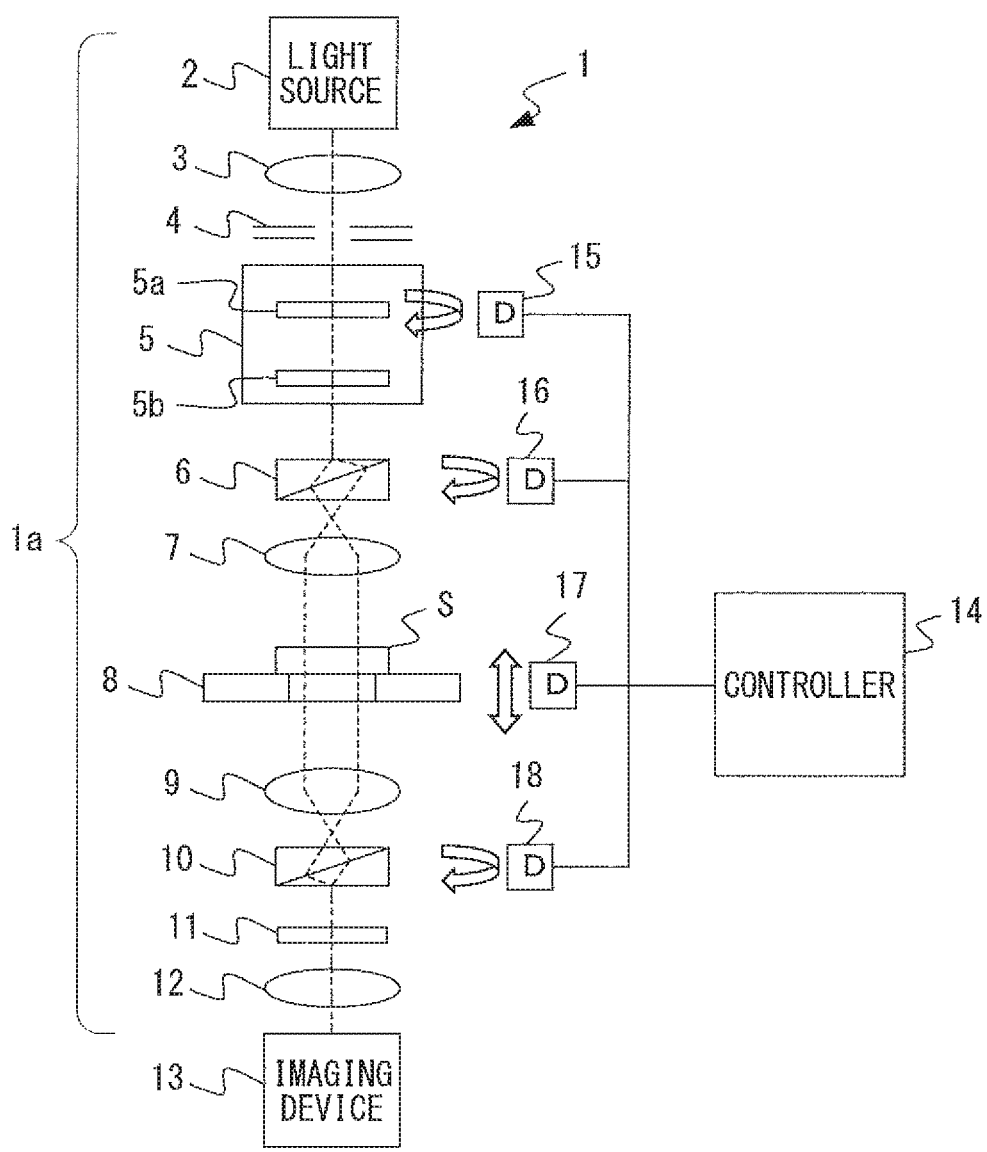
FIG. 2 illustrates the configuration of a microscope device 20.

FIG. 1 illustrates the configuration of an image processing system 100. FIG. 2 illustrates the configuration of a microscope device 20. FIG. 3 illustrates the configuration of an image processing device 30. The configuration of the image processing system. 100 is described with reference to FIG. 1 to FIG. 3.

The image processing system 100 according to this embodiment is a system that visualizes and evaluates a phase object such as a biological cell by acquiring an image of the phase object and processing the acquired image. The image processing system. 100 includes a microscope device 20, an image processing device 30 that processes an image acquired by the microscope device 20, a display device 40 that displays the image processed by the image processing device 30, and input devices (a keyboard 51 and a mouse 52), as illustrated in FIG. 1.

The microscope device 20 includes a microscope body 1 that acquires an image of a sample S that is a phase object, and a controller 14 that controls the microscope body 1, as illustrated in FIG. 1. The microscope body 1 includes an optical system 1a that converts a phase distribution into an image intensity distribution, a plurality of driving devices (driving devices 15, 16, 17, and 18) that move optical elements included in the optical system 1a, and an imaging device 13, as illustrated in FIG. 2. The controller 14 may be configured integrally with the microscope body 1, or may be configured separately from the microscope body 1.

The optical system 1a includes an illumination system, a stage 8, and a detection system. In the illumination system, a light source 2, a lens 3, a field stop 4, an image contrast changing unit 5, a Nomarski prism 6, and a condenser lens 7 are included. The image contrast changing unit 5 includes a polarizer 5a and a λ/4 plate 5b. In the detection system, an objective 9, a Nomarski prism 10, an analyzer 11, and a tube lens 12 are included. The imaging device 13 is, for example a camera including a charge coupled device (CCD) image sensor. The plurality of driving devices are, for example, motors such as stepping motors.

Light emitted from the light source 2 enters the polarizer 5a via the lens 3 and the field stop 4, is converted into linearly polarized light by the polarizer 5a, and is converted into circularly polarized light or elliptically polarized light by the λ/4 plate 5b. The light is split into an ordinary ray and an extraordinary ray by the Nomarski prism 6, and is applied to the sample S arranged on the stage 8 by the condenser lens 7. The ordinary ray and the extraordinary ray that have passed through the sample S enter the Nomarski prism 10 via the objective 9, and are combined by the Nomarski prism 10. The combined light enters the tube lens 12 via the analyzer 11, is collected on a light receiving surface of the CCD camera 13 by the tube lens 12, and forms a differential interference contrast image of the sample S. By doing this, the differential interference contrast image is acquired.

The ordinary ray and the extraordinary ray enter the sample S in slightly different positions. An amount of this positional difference is referred to as a shear amount, and the direction of the positional difference is referred to as a shear direction. The driving device 16 and the driving device 18 are devices that respectively rotate the Nomarski prism 6 and the Nomarski prism 10. The controller 14 controls the driving device 16 and the driving device 18 such that the microscope device 20 can acquire differential interference contrast images having different shear directions.

The ordinary ray and the extraordinary ray that have entered the sample S from different positions pass through positions in which the thickness and refractive index of the sample S are different. Therefore, rays of light combined by the Nomarski prism 10 have a phase difference due to a difference in an optical path length between the ordinary ray and the extraordinary ray. This phase difference is also referred to as retardation. The driving device 15 is a device that rotates the polarizer 5a. The controller 14 controls the driving device 15 such that the microscope device 20 can change a phase difference (retardation) of light at a point in time at which the light enters the Nomarski prism 6. By doing this, a phase difference (retardation) of light at a point in time at which the light enters the imaging device 13 is also changed, and therefore the image contrast of the differential interference contrast image can be changed.

The driving device 17 is a device that moves the stage 8 in a direction of the optical axis of the optical system 1a. The controller 14 controls the driving device 17 such that the microscope device 20 can sequentially move the focal position of the optical system 1a to plural positions within the sample S that are different from each other in the direction of the optical axis of the optical system 1a and a differential interference contrast image can be acquired via the optical system 1a in each of the plural positions.

The image processing device 30 is, for example, a standard computer. The image processing device 30 includes a processor 31, a memory 32, an input/output interface 33, a storage 34, and a portable recording medium driving device 35 into which a portable recording medium 36 is inserted, as illustrated in FIG. 3, and these components are connected to each other via a bus 37.

The processor 31 is, for example, a central processing unit (CPU), a micro processing unit (MPU), a digital signal processor (DSP), or the like, and the processor 31 executes a program and performs programmed processing such as corrected phase distribution calculation processing or phase object evaluation processing, as described later. The memory 32 is, for example, a random access memory (RAM), and the memory 32 transitorily stores a program or data that is recorded in the storage 34 or the portable recording medium 36 at a time when the program is executed.

The input/output interface 33 is a circuit that communicates a signal with a device other than the image processing device 30 (such as the microscope device 20, the display device 40, the keyboard 51, or the mouse 52). The storage 34 is, for example, a hard disk or a flash memory, and the storage 34 is principally used to record various types of data or programs. The portable recording medium driving device 35 houses the portable recording medium 36 such as an optical disk or a CompactFlash (registered trademark). The portable recording medium 36 has a function of supporting the storage 34. The storage 34 and the portable recording medium 36 are respective examples of a non-transitory computer-readable medium that records a program.

The configuration illustrated in FIG. 3 is an example of a hardware configuration of the image processing device 30, and the configuration of the image processing device 30 is not limited to this configuration. The image processing device 30 may be a dedicated device rather than a general-purpose device. The image processing device 30 may include an electric circuit such as an application specific integrated circuit (ASIC) or a field programmable gate array (FPGA) instead of or in addition to a processor that executes a program, and the electric circuit may perform the processing described later.

The display device 40 is, for example, a liquid crystal display or an organic EL display. The display device 40 may include a touch panel, and in this case, the display device 40 functions as an input device.

Figure 4:
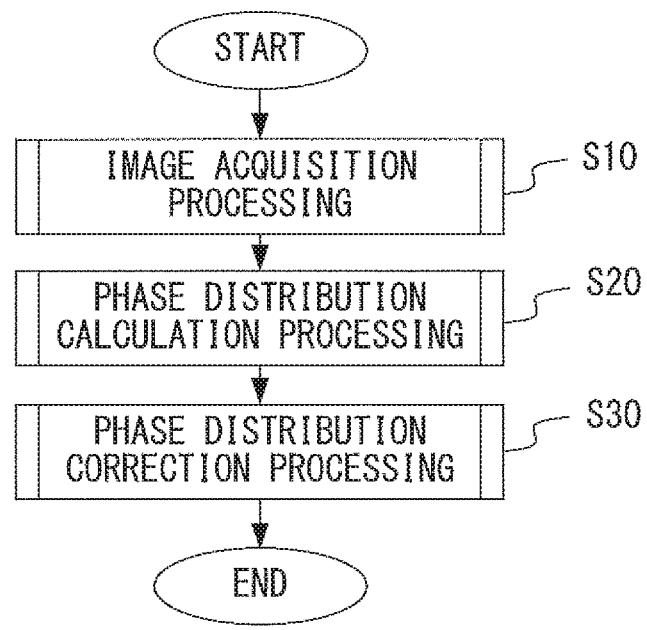
FIG. 4 illustrates an example of a flowchart of corrected phase distribution calculation processing.
Figure 5:
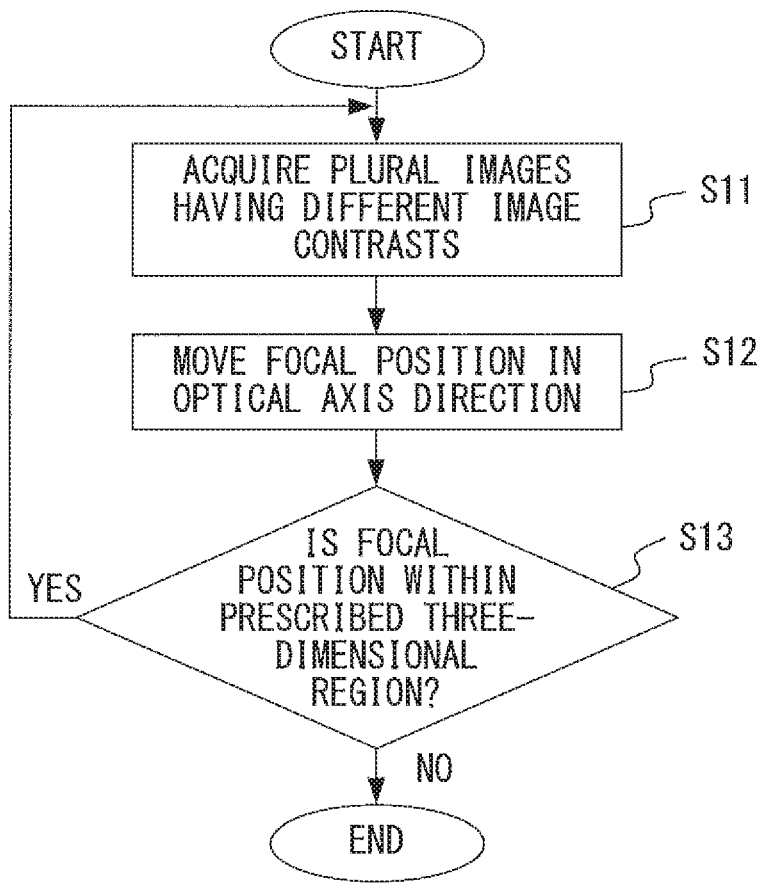
FIG. 5 illustrates an example of a flowchart of image acquisition processing.
Figure 7:
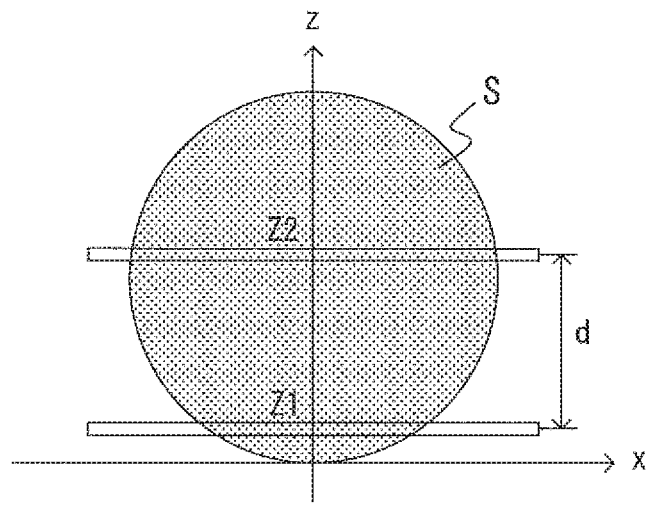
FIG. 7 illustrates a phase object when viewed from the side.
Figure 8A:
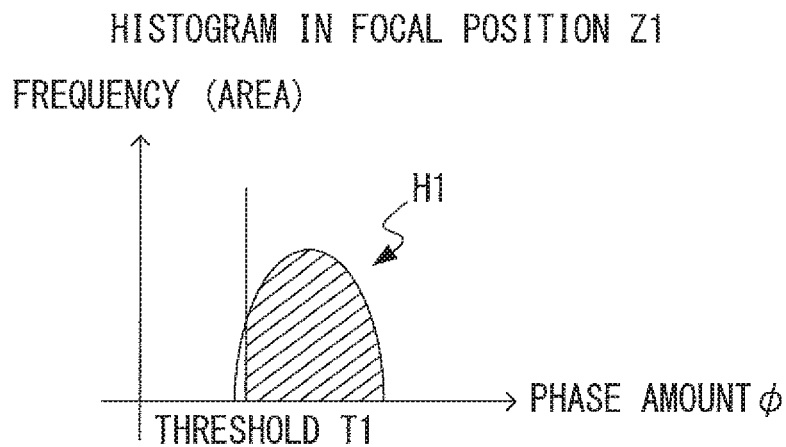
FIG. 8A is a histogram of the phase amount of imaging region P1.
Figure 8B:
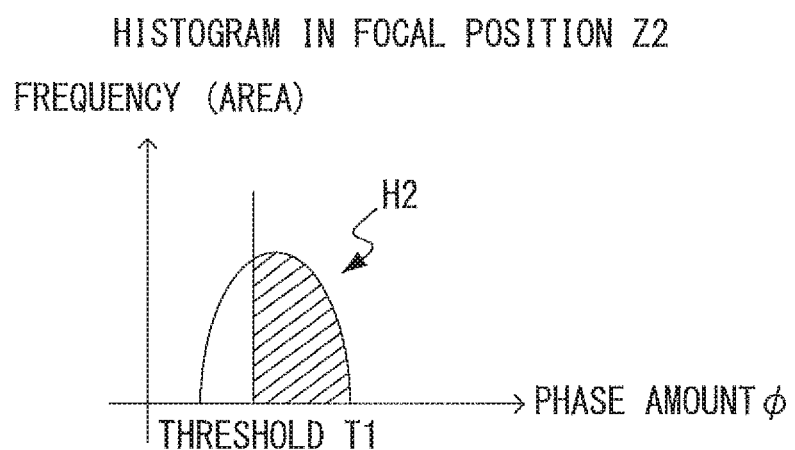
FIG. 8B is a histogram of the phase amount of imaging region P2.
Figure 10A:
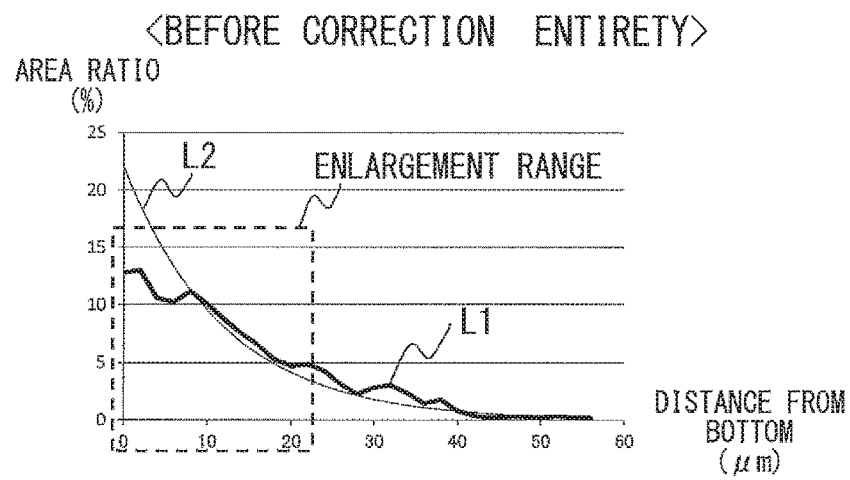
FIG. 10A illustrates a change in a depth direction in an area ratio of a region of interest to an object region before correction.
Figure 10B:
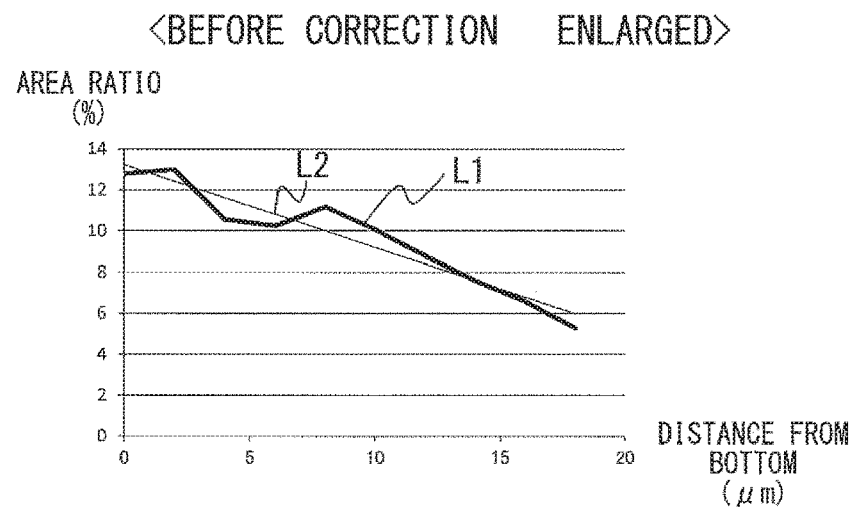
FIG. 10B is an enlarged view illustrating a change in a depth direction in an area ratio of a region of interest to an object region before correction.
Figure 10C:
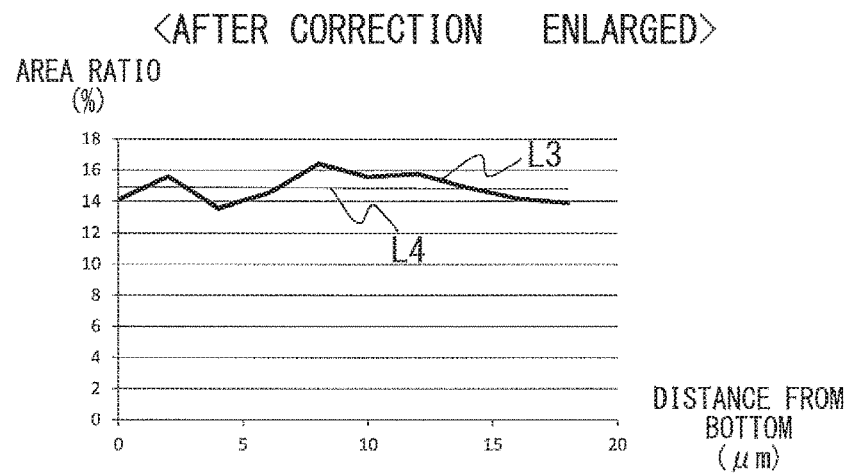
FIG. 10C is an enlarged view illustrating a change in a depth direction in an area ratio of a region of interest to an object region after correction.

FIG. 4 illustrates an example of a flowchart of corrected phase distribution calculation processing. FIG. 5 illustrates an example of a flowchart of image acquisition processing. FIG. 6 illustrates an example of a flowchart of phase distribution calculation processing. FIG. 7 illustrates the sample S serving as a phase object when viewed from the side. FIG. 8A is a histogram of the phase amount of imaging region P1. FIG. 8B is a histogram of the phase amount of imaging region P2. FIG. 9 illustrates an example of a flowchart of phase distribution correction processing. FIG. 10A illustrates a change in a depth direction in an area ratio of a region of interest to an object region before correction. FIG. 10B is an enlarged view illustrating a change in a depth direction in an area ratio of a region of interest to an object region before correction. FIG. 10C is an enlarged view illustrating a change in a depth direction in an area ratio of a region of interest to an object region after correction. The processing performed by the image processing system 100 is described with reference to FIG. 4 to FIG. 10C.

The corrected phase distribution calculation processing illustrated in FIG. 4 is processing for calculating the phase distribution of the sample S serving as a phase object with a high accuracy, and the corrected phase distribution calculation processing includes three processing procedures, image acquisition processing (step S10), phase distribution calculation processing (step S20), and phase distribution correction processing (step S30). The image acquisition processing is performed by the microscope device 20, and the phase distribution calculation processing and the phase distribution correction processing are performed by the image processing device 30.

In the image processing system 100, when the corrected phase distribution calculation processing is started, the microscope device 20 performs the image acquisition processing (step S10). In the image acquisition processing, the microscope device 20 first acquires a plurality of images having different image contrasts (step S11), as illustrated in FIG. 5.

More specifically, the controller 14 causes the driving device 16 and the driving device 18 to rotate the Nomarski prism 6 and the Nomarski prism 10 in such away that a shear direction is a direction of 45° with respect to a reference direction. The controller 14 causes the driving device 15 to rotate the polarizer 5a such that a retardation at a point in time at which light enters the Nomarski prism 6 is sequentially changed to $\pm\theta$ and 0, and the controller 14 causes the imaging device 13 to acquire three differential interference contrast images I1(-$\theta$), I1(0), and I1($\theta$) having different image contrasts. Further, the controller 14 causes the driving device 16 and the driving device 18 to rotate the Nomarski prism 6 and the Nomarski prism 10 in such a way that the shear direction is a direction of -45° with respect to the reference direction. The controller 14 causes the driving device 15 to rotate the polarizer 5a such that a retardation at a point in time at which light enters the Nomarski prism 6 is sequentially changed to $\pm\theta$ and 0, and the controller 14 causes the imaging device 13 to acquire three other differential interference contrast images I2 (-$\theta$), I2(0), and I2($\theta$) having different image contrasts. The differential interference contrast images acquired by the imaging device 13 are transmitted to the image processing device 30, and are stored in the storage 34 of the image processing device 30.

The microscope device 20 moves the focal position of the optical system 1a in the optical axis direction (step S12). Here, the controller 14 causes the driving device 17 to move the stage 8 by a prescribed distance $\Delta z$ in the optical axis direction such that the focal position moves in the optical axis direction.

When the movement of the focal position is completed, the microscope device 20 determines whether a focal position after movement is within a prescribed three-dimensional region in which a phase distribution is calculated (step S13). The microscope device 20 repeats the processes of step S11 to step S13 until the focal position is out of the prescribed three-dimensional region, and terminates the image acquisition processing. By doing this, the focal position of the optical system 1a is sequentially moved by the microscope device 20 to a plurality of positions within the phase object S that are different from each other by $\Delta z$ in the optical axis direction, and a plurality of differential interference contrast images having different image contrasts are acquired via the optical system 1a in the plural respective positions. The prescribed three-dimensional region is a region that is set in advance as a target region for the calculation of a phase distribution.

When the image acquisition processing is finished, in the image processing system 100, the image processing device 30 performs the phase distribution calculation processing (step S20). In the phase distribution calculation processing, the image processing device 30 first reads a plurality of differential interference contrast images acquired in the same focal position from the storage 34 into the memory 32 (step S21), as illustrated in FIG. 6.

The image processing device 30 generates a phase component image (step S22). Here, the processor 31 performs the arithmetic operations below by using the acquired plurality of differential interference contrast images that have been read in step S21 so as to generate a normalized phase component image for each shear direction. In the arithmetic operations, Def1 and Def2 are normalized phase component images.

Def1={I1($\theta$)-I1(-$\theta$)}/{I1($\theta$)+I1(-$\theta$)-I1(0)}

Def2={I2($\theta$)-I2(-$\theta$)}/{I2($\theta$)+I2(-$\theta$)-I2(0)}

By forming the normalized phase distribution images, an influence of a change in intensity due to absorption within the phase object can be reduced.

The image processing device 30 decomposes the normalized phase component images Def1 and Def2 according to a spatial frequency (step S23). Here, the image processing device 30 decomposes the normalized phase component image into a background component image having the lowest spatial frequency, a refractive component image that is generated by light refracted within the sample S, and a structural component image that is generated by light diffracted by a structure within the sample S and that has the highest spatial frequency by using a plurality of kernels having different sizes.

More specifically, the processor 31 performs averaging using an averaging filter having an averaging region (a kernel size) of 100×100 on each of the normalized phase component images Def1 and Def2 several times so as to generate background component images BG1 and BG2. The processor 31 respectively subtracts the background component images BG1 and BG2 from the normalized phase component images Def1 and Def2. Further, the processor 31 performs averaging using an averaging filter having an averaging region (a kernel size) of 20×20 on each of the obtained images (Def1−BG1) and (Def2−BG2) in which a disturbance such as irregularity in a field of view has been removed several times. As a result, refractive component images GR1 and GR2 are generated. Furthermore, the processor 31 subtracts the background component images BG1 and BG2 and the refractive component images GR1 and GR2 from the normalized phase component images Def1 and Def2 so as to generate structural component images ST1(=Def1−BG1−GR1) and ST2(=Def2−BG2−GR2).

When the normalized phase component images Def1 and Def2 are decomposed according to the spatial frequency, the image processing device 30 calculates a phase distribution (step S24). Here, the image processing device 30 first performs deconvolution on the structural component images ST1 and ST2 by using an optical transfer function (OTF) in a focusing state of the optical system 1a, and calculates structural component phase distributions PhS1 and PhS2 indicating the microstructure of an object. The image processing device 30 combines the structural component phase distributions PhS1 and PhS2, and calculates a new phase distribution.

The structural component phase distributions PhS1 and PhS2 are structural component phase distributions that are calculated by setting different shear directions for the same object (the sample S). Therefore, the structural component phase distributions PhS1 and PhS2 are similar to each other aside from phase distributions relating to structures that are almost perpendicular to respective shear directions. Utilizing this point, as an example, a phase-only correlation method may be applied to the structural component phase distributions PhS1 and PhS2 so as to calculate a relative amount ($\delta x, \delta y$) of a positional difference between two images. The structural component phase distributions PhS1 and PhS2 may be combined after correcting a positional difference between the structural component phase distributions PhS1 and PhS2 by using the calculated relative amount of the positional difference, and a phase distribution may be calculated.

When the calculation of the phase distribution is completed, the image processing device 30 determines whether differential interference contrast images in all of the focal positions have been read from the processor 31 (step S25). When differential interference contrast images in some of the focal positions have not been read, the image processing device 30 reads a plurality of differential interference contrast images acquired in a focal position next to the focal position in step S21 from the storage 34 into the memory 32 (step S26).

The image processing device 30 repeats the processes of step S22 to step S26 until differential interference contrast images in all of the focal positions have been read, and terminates the phase distribution calculation processing. By doing this, the phase distribution of a prescribed three-dimensional region that corresponds to a plurality of images is calculated by the image processing device 30 on the basis of a plurality of differential interference contrast images that the microscope device 20 has acquired in a plurality of positions that are different from each other in the optical axis direction. Hereinafter, the phase distribution of the three-dimensional region that has been calculated in the phase distribution calculation processing illustrated in FIG. 6 is referred to as a first phase distribution.

Taking, as an example, a case in which an image of the sample S illustrated in FIG. 7 is acquired by the inverted microscope illustrated in FIG. 2, an image acquired in focal position Z2 is an image acquired in a position further away from the surface (the bottom) of the sample S, and therefore the image acquired in focal position Z2 receives a greater influence of the scattering of light than an image acquired in focal position Z1. Therefore, the first phase distribution calculated in the phase distribution calculation processing illustrated in FIG. 6 indicates a significantly attenuated phase amount at focal position Z2 due to the influence of scattering in comparison with focal position Z1.

When the sample S serving as a phase object is a biological cell or the like, it can be considered that organelles such as mitochondria are distributed uniformly within the cell. Therefore, as illustrated in FIG. 8A and FIG. 8B, the shape of histogram H1 and the shape of histogram H2 do not receive an influence of attenuation due to scattering, and are almost similar to each other regardless of the shape of the sample S. Histogram H1 is a histogram of a phase amount calculated from an image acquired in focal position Z1 illustrated in FIG. 7, and histogram H2 is a histogram of a phase amount calculated from an image acquired in focal position Z2. In contrast, the attenuation in a phase amount due to scattering makes the distribution positions of both histograms different. Assume that a phase amount that corresponds to a specified structure such as a mitochondrion that is distributed uniformly within a cell is the threshold T1. This difference in the distribution position between the histograms can be calculated as a difference in a ratio of a phase amount that is greater than or equal to the threshold T1 occupying each of the histograms.

Scattering due to a cell is weak scattering, and considering that a phase amount (a phase distribution) is attenuated according to the Lambert-Beer law, attenuation characteristics can be calculated according to a difference in a ratio of a phase amount that is greater than or equal to the threshold T1 and a distance between focal positions (distance d illustrated in FIG. 7). By doing this, an influence of attenuation due to scattering can be estimated. Therefore, in the image processing system 100, when the phase distribution calculation processing is finished, the image processing device 30 performs phase distribution correction processing for correcting the first phase distribution in such a way that an amount of attenuation in a phase amount due to the scattering of light within a phase object is compensated for (step S30).

In the phase distribution correction processing, the image processing device 30 first specifies an object region in a prescribed three-dimensional region, as illustrated in FIG. 9

(step S31). The prescribed three-dimensional region is a region that corresponds to a plurality of images acquired by the microscope device 20. Here, the processor 31 specifies an object region in which the sample S exists within a prescribed three-dimensional image region in accordance with the first phase distribution calculated in the phase distribution calculation processing. As an example, using the fact that a phase amount has an extremely small value in a region in which the sample S serving as a phase object does not exist, the processor 31 may extract a region that has a phase amount that is greater than or equal to a prescribed value in accordance with the first phase distribution, and may specify the extracted region as an object region.

When the object region is specified, the image processing device 30 specifies a region of interest in the prescribed three-dimensional region (step S32). The region of interest is a region having a phase amount that is greater than or equal to the threshold T1, which is a phase amount that corresponds to a specified structure within the sample S, and the region of interest is, for example, a region having a phase amount that is greater than or equal to a phase amount that corresponds to a mitochondrion within the sample S. The threshold T1 indicates a phase amount that is greater than the prescribed value used in step S31. Here, the processor 31 specifies the region of interest according to the first phase distribution calculated in the phase distribution calculation processing and the threshold T1.

When the object region and the region of interest are specified, the image processing device 30 calculates the attenuation characteristics of the sample S (step S33). Here, the processor 31 calculates the attenuation characteristics of the sample S according to a change in the optical axis direction (a depth direction) in the region of interest specified in step S32. More specifically, the processor 31 first calculates an area ratio of the region of interest to the object region for each distance from the bottom of the sample. The area ratio of the region of interest to the object region is a ratio of the region of interest occupying the object region, and is calculated according to "area of region of interest/area of object region". The processor 31 calculates the attenuation characteristics of the sample S according to a change in the optical axis direction in the calculated area ratio. In the case of an upright microscope, a reference surface is not the bottom of the sample but is the top of the sample, and therefore the area ratio may be calculated for each distance from the top of the sample.

Line L1 of FIG. 10A is obtained by plotting an area ratio calculated for each distance from the bottom of the sample S. As the distance from the bottom of the sample S illustrated in FIG. 10A decreases, the z position illustrated in FIG. 7 also decreases. As the distance from the bottom of the sample S increases, an influence of the scattering of light increases. Therefore, a region of interest that is considered to exist at a fixed ratio regardless of a distance from the bottom decreases as the distance from the bottom increases, and consequently the area ratio decreases, as indicated by line L1.

Scattering on the sample S is weak scattering, and a phase amount (a phase distribution) is attenuated according to the Lambert-Beer law, and therefore phase amounts $\Phi_{Z1}$ and $\Phi_{Z2}$ two points that are different by distance d in the depth direction have the relationship expressed by equation (1) described below. k is a coefficient indicating an attenuation characteristic relating to a phase amount (hereinafter referred to as a phase attenuation coefficient) of the sample S.

$$\Phi_{Z2} = \Phi_{Z1} \times \exp(-kd) \quad (1)$$

A phase amount in equation (1) can be replaced with an area ratio of a region of interest to an object region. Therefore, area ratios $SR_{Z1}$ and $SR_{Z2}$ at two points that are different by distance d in the depth direction have the relationship expressed by equation (2) described below.

$$SR_{Z2} = SR_{Z1} \times \exp(-kd) \quad (2)$$

Namely, the area ratio exponentially changes in the optical axis direction according to the phase attenuation coefficient k of the sample S, as expressed by equation (2). By using this characteristic, the processor 31 calculates the phase attenuation coefficient k. The processor 31 may calculate the phase attenuation coefficient k by applying, for example, a least-squares method to the area ratio calculated for each distance from the bottom so as to calculate an approximate function having the relationship expressed by equation (2). Line L2 of FIG. 10A indicates the approximate function calculated by the processor 31.

Equation (1) and equation (2) can be approximated, as expressed by the equations below, by expanding an exponential function when d is small.

$$\Phi_{Z2} = \Phi_{Z1}(1-kd) \quad (1\text{-}1)$$

$$SR_{Z2} = SR_{Z1}(1-kd) \quad (2\text{-}1)$$

Namely, the area ratio can be regarded as locally changing linearly in the optical axis direction according to the phase attenuation coefficient k of the sample S, as expressed by equation (2-1). FIG. 10B is an enlarged view of the enlargement range illustrated in FIG. 10A, and line L2 is illustrated with an almost straight line in FIG. 10B.

Finally, the image processing device 30 corrects the phase amount of the object region according to the attenuation characteristics (step S34). Here, the processor 31 corrects the phase amount of the object region specified in step S31 in the prescribed three-dimensional region in accordance with the attenuation characteristics calculated in step S33. More specifically, the processor 31 corrects the phase amount of the object region in such a way that an amount of attenuation in a phase amount for each distance from the bottom that has been calculated according to the attenuation characteristics is compensated for. This is performed by converting line L2, which is an approximate function, into line L4, which is an approximate function indicating a fixed value regardless of the distance from the bottom. The fixed value indicated by line L4 of FIG. 10C corresponds to an area ratio on the bottom of the sample S illustrated in FIG. 7. By doing this, the area ratio approaches a ratio on the bottom of the sample S regardless of the distance from the bottom, and becomes almost constant, as illustrated by line L3 in FIG. 10C.

As described above, the image processing device 30 performs the phase distribution correction processing illustrated in FIG. 9 such that the first phase distribution is corrected according to a change in the optical axis direction in a region of interest specified in a three-dimensional region and a second phase distribution in which attenuation in a phase amount due to scattering is reduced is calculated.

In the image processing system 100 according to this embodiment, by performing the corrected phase distribution calculation processing illustrated in FIG. 4, an influence of attenuation in a phase amount due to scattering can be reduced by correcting. Therefore, the phase distribution of a phase object can be calculated with a high accuracy. Accordingly, as an example, even when a relatively large phase object such as a spheroid or a colony in which cells form a three-dimensional aggregate is a target to be observed, the phase object can be visualized satisfactorily.

Further, by displaying an image in which a phase object is visualized according to the second phase distribution, an effect whereby the accuracy of the determination of the quality of a pluripotent cell is improved, an effect whereby a change in quality within a colony of pluripotent cells can be evaluated three-dimensionally, an effect whereby respective cells in a spheroid can be observed, and other effects can be expected, for example. In addition, an effect whereby the accuracy of the detection of the degeneration, necrosis, or the like of a cell within the spheroid is improved, an effect whereby an image of a spheroid upper cell (namely, the deep part of a spheroid) can be further emphasized and can be observed more clearly than is conventional, and other effects can be expected.

Figure 11:
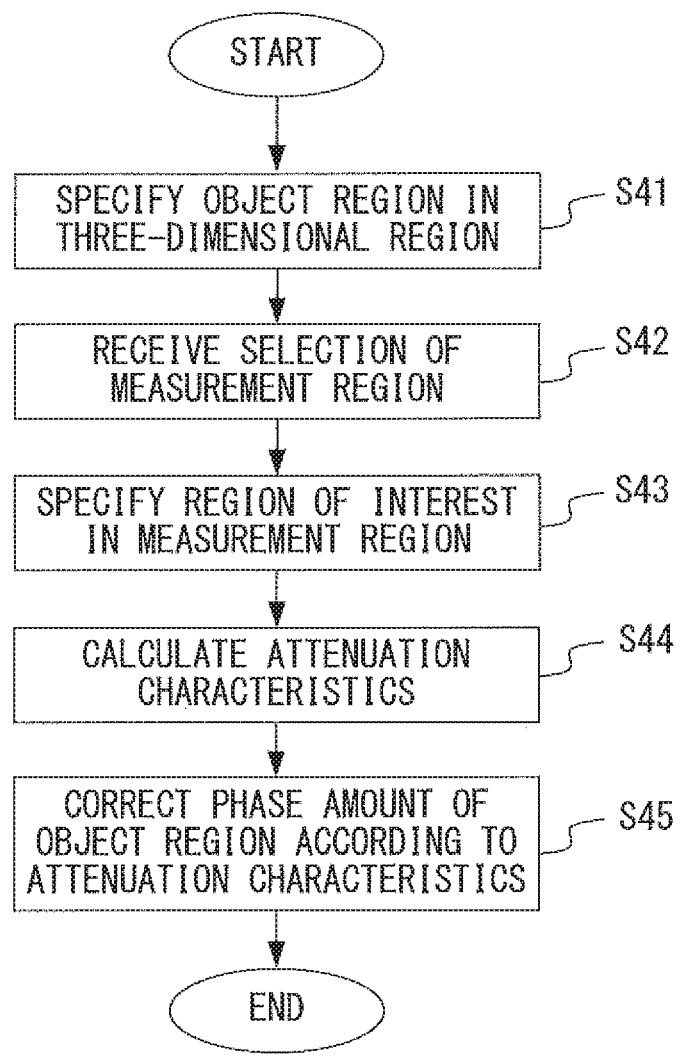
FIG. 11 illustrates another example of the flowchart of phase distribution correction processing.

FIG. 11 illustrates another example of the flowchart of phase distribution correction processing. In the image processing system 100, the phase distribution correction processing illustrated in FIG. 11 may be performed instead of the phase distribution correction processing illustrated in FIG. 9.

The phase distribution correction processing illustrated in FIG. 11 is performed by the image processing device 30 similarly to the phase distribution correction processing illustrated in FIG. 9. First, the image processing device 30 specifies an object region in a prescribed three-dimensional region (step S41). The process of step S41 is similar to the process of step S31 in FIG. 9.

The image processing device 30 receives the selection of a measurement region (step S42). Here, a user of the system selects a measurement region in the object region specified in step S41 by using the keyboard 51 and the mouse 52, and the image processing device 30 detects the user's operation and specifies the selected measurement region. When the selected measurement region is excessively small, the measurement region may only include a specified structure within the sample S, and the measurement region may not be suitable for a region that represents the sample S. Therefore, when the selected measurement region is excessively small, the image processing device 30 may recommend that the user perform setting again.

When the measurement region is selected and specified, the image processing device 30 specifies a region of interest in the measurement region (step S43). Here, the processor 31 specifies a region of interest in the measurement region in accordance with the first phase distribution, the first threshold T1, and the measurement region selected in step S42. The region of interest is a region having a phase amount that is greater than or equal to the threshold T1, and is, for example, a region having a phase amount that is greater than or equal to a phase amount that corresponds to a mitochondrion within the sample S.

When the measurement region and the region of interest are specified, the image processing device 30 calculates the attenuation characteristics of the sample S (step S44). Here, the processor 31 calculates the attenuation characteristics of the sample S in accordance with a change in the optical axis direction (the depth direction) in the region of interest calculated in step S43. More specifically, the processor 31 first calculates an area ratio of the region of interest to the measurement region for each distance from the bottom of the sample S. The area ratio of the region of interest to the measurement region is a ratio of a region of interest occupying the measurement region, and is calculated according to "area of region of interest/area of measurement region". The processor 31 calculates the attenuation characteristics of the sample S in accordance with a change in the optical axis direction in the calculated area ratio. The attenuation characteristics are calculated, for example, as the phase attenuation coefficient described above.

Finally, the image processing device 30 corrects the phase amount of the object region according to the attenuation characteristics (step S45). The process of step S45 is similar to the process of step S34 in FIG. 9.

The phase distribution correction processing illustrated in FIG. 11 is different from the phase distribution correction processing illustrated in FIG. 9 in that attenuation characteristics are calculated according to an area ratio of a region of interest in a measurement region that is a portion of an object region to the measurement region. The area ratio used to calculate the attenuation characteristics may be any area ratio of a region of interest within a region in which a specified structure that corresponds to the threshold T1 is uniformly distributed with respect to the region in which the specified structure is uniformly distributed. Accordingly, in the image processing system 100 according to this embodiment, even when the phase distribution correction processing illustrated in FIG. 11 is performed instead of the phase distribution correction processing illustrated in FIG. 9, an influence of attenuation in a phase amount can be reduced by correcting, and the phase distribution of a phase object can be calculated with a high accuracy.

Figure 12:
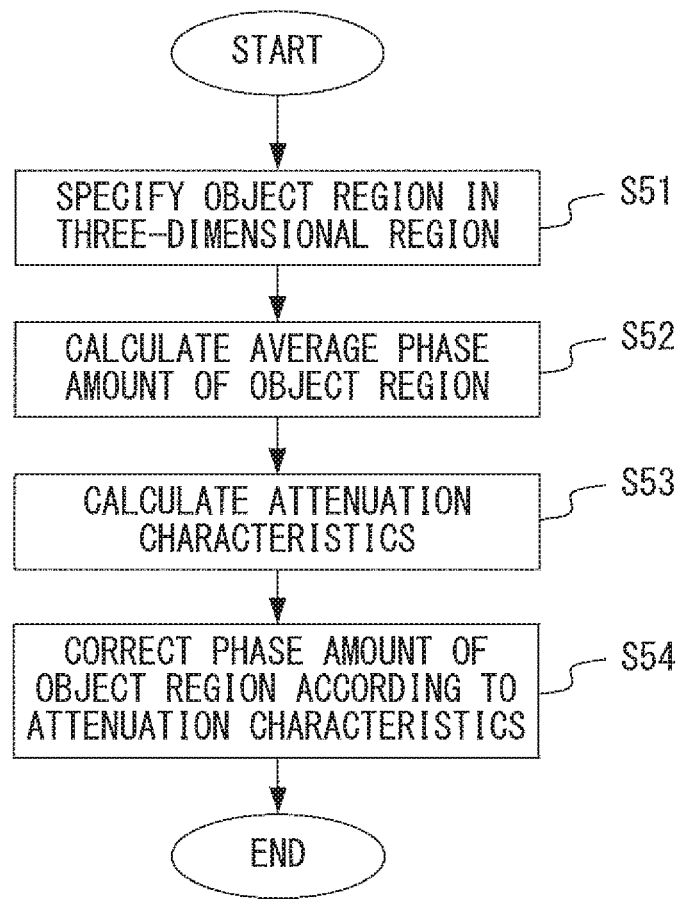
FIG. 12 illustrates yet another example of the flowchart of phase distribution correction processing.

FIG. 12 illustrates yet another example of the flowchart of phase distribution correction processing. In the image processing system 100, the phase distribution correction processing illustrated in FIG. 12 may be performed instead of the phase distribution correction processing illustrated in FIG. 9.

The phase distribution correction processing illustrated in FIG. 12 is performed by the image processing device 30 similarly to the phase distribution correction processing illustrated in FIG. 9. First, the image processing device 30 specifies an object region in a prescribed three-dimensional region (step S51). The process of step S51 is similar to the process of step S31 in FIG. 9. The object region specified in step S51 is also specified as a region of interest in the description below.

The image processing device 30 calculates an average phase amount of the object region (the region of interest) for each distance from the bottom of the sample S (step S52). Here, the processor 31 calculates the average phase amount of the object region for each of the distances from the bottom in accordance with the first phase distribution and the object region calculated in step S51.

When the average phase amount is calculated, the image processing device 30 calculates the attenuation characteristics of the sample S (step 53). Here, the processor 31 calculates a scattering coefficient of the sample S in accordance with a change in the optical axis direction (the depth direction) in the average phase amount of the object region that has been calculated in step S52. The average phase amount of the object region that has been calculated in step S52 corresponds to the phase amounts expressed by equation (1) and equation (1-1), and corresponds to the area ratios expressed by equation (2) and equation (2-1). Therefore, in step S53, the attenuation characteristics can be calculated in a procedure similar to the procedure of step S33 in FIG. 9 except that a change in the optical axis direction in the average phase amount is used instead of a change in the optical axis direction in the area ratio.

Finally, the image processing device 30 corrects the phase amount of the object region in accordance with the attenuation characteristics (step S54). The process of step S54 is similar to the process of step S34 in FIG. 9.

In the image processing system 100 according to this embodiment, even when the phase distribution correction processing illustrated in FIG. 12 is performed instead of the phase distribution correction processing illustrated in FIG. 9, an influence of attenuation in a phase amount can be reduced by correcting, and the phase distribution of a phase object can be calculated with a high accuracy.

Figure 13:
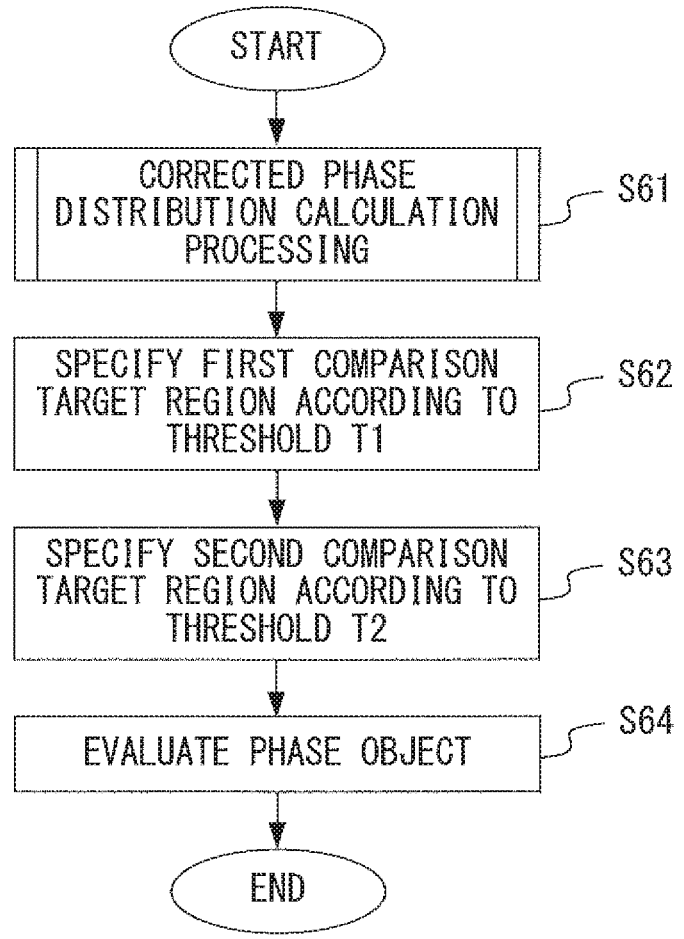
FIG. 13 illustrates an example of a flowchart of phase object evaluation processing.

FIG. 13 illustrates an example of a flowchart of phase object evaluation processing. The image processing system 100 may evaluate a phase object in accordance with a phase distribution calculated with a high accuracy. Phase object evaluation processing for evaluating the pluripotency of the sample S serving as a phase object is described below with reference to FIG. 13 by using as an example a case in which the sample S is a phase object including an iPS cell, which is a pluripotent cell.

In an undifferentiated iPS cell, which is a somatic cell that has been induced to have induced pluripotency, the shape of a mitochondrion and the number of mitochondria are different from those in a normal somatic cell. In addition, in an iPS cell after differentiation induction, the shape of a mitochondrion and the number of mitochondria are close to the shape of a mitochondrion and the number of mitochondria in a normal somatic cell. Therefore, the pluripotency of a phase object including an iPS cell can be evaluated according to a ratio of an undifferentiated iPS cell to an iPS cell after differentiation induction and other somatic cells, and their distribution states.

When the image processing system 100 starts the phase object evaluation processing, the image processing system 100 performs corrected phase distribution calculation processing, and calculates a second phase distribution (step S61). The process of step S61 is similar to the corrected phase distribution calculation processing illustrated in FIG. 4.

The image processing system 100 specifies a first comparison target region in a prescribed three-dimensional region in accordance with the threshold T1 (step S62). Here, the processor 31 specifies the first comparison target region in accordance with the second phase distribution calculated in step S61 and the threshold T1. The threshold T1 is a phase amount that corresponds to a specified structure such as a mitochondrion that is uniformly distributed in a cell, and more specifically, the threshold T1 is a phase amount that corresponds to a mitochondrion in a normal somatic cell that is not an iPS cell. A phase amount that corresponds to a mitochondrion in an undifferentiated iPS cell is smaller than the threshold T1. The first comparison target region is a region having a phase amount that is greater than or equal to the threshold T1 in a prescribed three-dimensional region, and is a region in which a cell that does not have pluripotency (namely, a normal somatic cell and an iPS cell after differentiation induction) exists.

Further, the image processing system 100 specifies a second comparison target region in the prescribed three-dimensional region in accordance with the threshold T2 (Step S63). Here, the processor 31 specifies the second comparison target region in accordance with the second phase distribution calculated in step S61 and the threshold T2. The threshold T2 is a phase amount that is smaller than the threshold T1, and the threshold T2 is, for example, a phase amount that corresponds to a mitochondrion in an undifferentiated iPS cell. The second comparison target region is a region having a phase amount that is greater than or equal to the threshold T2 in the prescribed three-dimensional region, and is a region in which a cell (including a normal somatic cell, an undifferentiated iPS cell, and an iPS cell after differentiation induction) exists.

Finally, the image processing system 100 evaluates the sample S in accordance with a result of a comparison between the first comparison target region and the second comparison target region (step S64). Here, the processor 31 first calculates the sizes of the first and second comparison target regions, and further calculates a ratio of the size of the first comparison target region to the size of the second comparison target region. The size refers to a magnitude, and is, for example, an area or a volume. A size ratio means a ratio of the first comparison target region to the second comparison target region, and is calculated according to "size of first comparison target region/size of second comparison target region". The sample S is evaluated according to the calculated size ratio. As an example, it can be determined that, as the ratio increases, a ratio of the existence of a cell that does not have pluripotency increases and pluripotency is low. Therefore, the processor 31 may determine a level of the pluripotency of the sample S according to the ratio. The processor 31 may output a determination result to the display device 40, and the display device 40 may display the determination result. The processor 31 may display the first comparison target region and the second comparison target region on an image of the sample S that has been visualized according to the second phase distribution such that the first comparison target region and the second comparison target region can be distinguished from each other.

In the image processing system 100 according to this embodiment, the phase distribution of the sample S can be calculated with a high accuracy by performing the phase object evaluation processing illustrated in FIG. 13. In addition, by using a plurality of thresholds, a region in which no cells exist in a colony due to necrosis or the like can be prevented from being erroneously added to an evaluation target. Accordingly, the sample S can be correctly evaluated according to the phase distribution of the sample S.

An example in which the pluripotency of the sample S is evaluated has been described above, but a target to be evaluated in phase object evaluation processing is not limited to the pluripotency of the sample S. The sample S can be evaluated from various points of view in accordance with a plurality of thresholds indicating different phase amounts. As an example, the threshold T1 may be set to be a phase amount that corresponds to a mitochondrion in a normal somatic cell, and the threshold T2 may be set to be a phase amount that corresponds to a mitochondrion in a cancer cell. By calculating a ratio of the size of the first comparison target region to the size of the second comparison target region according to these thresholds, a degree of the progression of cancer in a cell may be evaluated. As the threshold, a phase amount that corresponds to a mitochondrion does not always need to be set, but a phase amount that corresponds to an arbitrary organelle may be set. In addition, the ratio of the size of the first comparison target region to the size of the second comparison target region may be a volume ratio or an area ratio. As an example, by focusing on a specified cross section in a prescribed three-dimensional region and calculating an area ratio of the first comparison target region to the second comparison target region in the cross section of interest, the pluripotency or the like of a phase object may be evaluated.

An example in which the first and second comparison target regions are specified in a prescribed three-dimensional region has been described above, but as an example, the first and second comparison target regions may be specified in cell units. In this case, pluripotency or the like can be evaluated in cell units rather than in units of the sample S.

Second Embodiment

FIG. 14 illustrates an example of the flowchart of phase object evaluation processing according to this embodiment. The configuration of an image processing system according to this embodiment (hereinafter simply referred to as an image processing system) is similar to the configuration of the image processing system 100. The image processing system is different from the image processing system 100 in that the image processing device 30 does not perform phase distribution correction processing. The phase object evaluation processing according to this embodiment is described below with reference to FIG. 14.

When the image processing system starts the phase object evaluation processing, the microscope device 20 performs image acquisition processing (step S71), and the image processing device 30 performs phase distribution calculation processing (step S72). By doing this, a first phase distribution is calculated. The processes of step S71 and step S72 are similar to the processes of step S10 and step S20 in FIG. 4, respectively.

The image processing system specifies a first comparison target region in a prescribed three-dimensional region in accordance with the threshold T1 (step S73), and specifies a second comparison target region in the prescribed three-dimensional region in accordance with the threshold T2 (step S74). Here, the threshold T1 and the threshold T2 are, for example, a phase amount that corresponds to a mitochondrion in a normal somatic cell that is not an iPS cell and a phase amount that corresponds to a mitochondrion in an undifferentiated iPS cell, respectively. The threshold T2 is a phase amount that is smaller than the threshold T1. The processes of step S73 and step S74 are respectively similar to the processes of step S62 and step S63 in FIG. 13.

Finally, the image processing system evaluates the sample S in accordance with a result of a comparison between the first comparison target region and the second comparison target region (step S75). The process of step S75 is similar to the process of step S64 in FIG. 13.

In the image processing system according to this embodiment, similarly, a plurality of thresholds are used, and therefore a region in which no cells exist in a colony due to necrosis or the like can be prevented from being erroneously added to a target to be evaluated. Accordingly, by performing the phase object evaluation processing illustrated in FIG. 14, the sample S can be correctly evaluated according to the phase distribution of the sample S.

The embodiments described above give specific examples in order to make the invention easily understandable, and the embodiments of the present invention are not limited to the embodiments described above. Various modifications or variations can be made to the phase distribution calculation method, the evaluation method, the image processing device, and the image processing system without departing from the recitation in the claims. As an example, the optical system 1a of a differential interference contrast microscope that projects the structure (the phase distribution) of the sample S as an image intensity distribution onto the light receiving surface of an image sensor is illustrated in FIG. 2, but an optical system of a microscope device may be any optical system that converts a phase distribution into an image intensity distribution, and may be, for example, an optical system of a phase-contrast microscope.

What is claimed is:

1. A phase distribution calculation method comprising:
   sequentially moving a focal position of an optical system that converts a phase distribution into an image intensity distribution to a plurality of positions within a phase object, the plurality of positions being different from each other in an optical axis direction of the optical system, and acquiring an image via the optical system in each of the plurality of positions;
   calculating a first phase distribution of a three-dimensional region that corresponds to a plurality of images acquired in the plurality of positions, in accordance with the plurality of images; and
   correcting the first phase distribution in accordance with a change in the optical axis direction in a region of interest specified in the three-dimensional region,
   wherein the correcting the first phase distribution includes:
      calculating attenuation characteristics of the phase object in accordance with the change in the optical axis direction in the region of interest;
      correcting a phase amount of an object region in which the phase object exists in the three-dimensional region in accordance with the attenuation characteristics;
      specifying the object region in the three-dimensional region in accordance with the first phase distribution; and
      specifying the region of interest in accordance with the first phase distribution and a first threshold that is a phase amount that corresponds to a specified structure within the phase object, and
   wherein the calculating the attenuation characteristics includes:
      calculating an area ratio of the region of interest to the object region; and
      calculating the attenuation characteristics of the phase object in accordance with a change in the optical axis direction in the area ratio.

2. The phase distribution calculation method according to claim 1, wherein the specifying the region of interest includes specifying the region of interest in a measurement region that is selected in the three-dimensional region in accordance with the first phase distribution, the first threshold, and the measurement region.

3. The phase distribution calculation method according to claim 2, wherein the first threshold is a phase amount that corresponds to a mitochondrion.

4. The phase distribution calculation method according to claim 1, wherein the first threshold is a phase amount that corresponds to a mitochondrion.

5. The phase distribution calculation method according to claim 1, wherein the calculating the attenuation characteristics includes calculating the attenuation characteristics of the phase object in accordance with a change in the optical axis direction in an average phase amount of the region of interest.

6. An evaluation method comprising:
   calculating a second phase distribution by correcting the first phase distribution using the phase distribution calculation method according to claim 1;
   specifying a first comparison target region in the three-dimensional region in accordance with the second phase distribution and the first threshold;
   specifying a second comparison target region in the three-dimensional region in accordance with the second phase distribution and a second threshold that is a phase amount smaller than the first threshold; and evaluating the phase object in accordance with a result of a comparison between the first comparison target region and the second comparison target region.

7. The evaluation method according to claim 6, wherein the evaluating the phase object includes:

calculating a ratio of a size of the first comparison target region to a size of the second comparison target region; and evaluating the phase object in accordance with the calculated ratio.

8. An image processing device that processes a plurality of images acquired by a microscope device, wherein the microscope device is configured to:
include an optical system that converts a phase distribution into an image intensity distribution; and
sequentially move a focal position of the optical system to a plurality of positions within a phase object, the plurality of positions being different from each other in an optical axis direction of the optical system, and acquire an image via the optical system in each of the plurality of positions, wherein the image processing device is configured to:
calculate a first phase distribution of a three-dimensional region that corresponds to a plurality of images that are acquired by the microscope device in the plurality of positions, in accordance with the plurality of images; and
correct the first phase distribution in accordance with a change in the optical axis direction in a region of interest that is specified in the three-dimensional region in accordance with the first phase distribution, wherein the correcting the first phase distribution includes:
calculating attenuation characteristics of the phase object in accordance with the change in the optical axis direction in the region of interest;
correcting a phase amount of an object region in which the phase object exists in the three-dimensional region in accordance with the attenuation characteristics;

specifying the object region in the three-dimensional region in accordance with the first phase distribution; and specifying the region of interest in accordance with the first phase distribution and a first threshold that is a phase amount that corresponds to a specified structure within the phase object, and wherein the calculating the attenuation characteristics includes:
calculating an area ratio of the region of interest to the object region; and
calculating the attenuation characteristics of the phase object in accordance with a change in the optical axis direction in the area ratio.

9. An evaluation method comprising:

sequentially moving a focal position of an optical system that converts a phase distribution into an image intensity distribution to a plurality of positions within a phase object, the plurality of positions being different from each other in an optical axis direction of the optical system, and acquiring an image via the optical system in each of the plurality of positions;

calculating a first phase distribution of a three-dimensional region that corresponds to a plurality of images acquired in the plurality of positions, in accordance with the plurality of images;

specifying a first comparison target region in the three-dimensional region in accordance with the first phase distribution and a first threshold that is a phase amount that corresponds to a specified structure within the phase object;

specifying a second comparison target region in the three-dimensional region in accordance with the first phase distribution and a second threshold that is a phase amount smaller than the first threshold; and evaluating the phase object in accordance with a result of a comparison between the first comparison target region and the second comparison target region.

* * * * *